Nov. 17, 1970   C. W. GASTON   3,541,442
METHOD OF OBTAINING REAL-TIME SPECTRAL ANALYSIS OF COMPLEX
WAVEFORMS USING MECHANICALLY RESONANT OPTICAL FIBERS
Filed July 5, 1968

INVENTOR
CHARLES W. GASTON

BY

ATTORNEY

United States Patent Office 3,541,442
Patented Nov. 17, 1970

3,541,442
METHOD OF OBTAINING REAL-TIME SPECTRAL ANALYSIS OF COMPLEX WAVEFORMS USING MECHANICALLY RESONANT OPTICAL FIBERS
Charles W. Gaston, Linthicum Heights, Md., assignor to the United States of America as represented by the Secretary of the Army
Filed July 5, 1968, Ser. No. 742,821
Int. Cl. G01r 23/16
U.S. Cl. 324—77　　　　　　　　　　　　　　13 Claims

ABSTRACT OF THE DISCLOSURE

A method of obtaining real-time spectral analysis of complex waveforms using a rake scan cathode ray tube to sequentially, and individually, illuminate a plurality of mechanically resonant optical fibers which are vibrated in unison by the complex waveforms to be analyzed. A group of optical fibers and a high sensitivity photomultiplier are assembled in a light-tight enclosure. A photomultiplier detects the output of the optical fibers which have been illuminated. The components of the input complex waveform are independently displayed and analyzed at the output of the apparatus.

FIELD OF THE INVENTION

The present invention is directed to a method of spectral analysis, and more particularly to a method of obtaining real-time spectral analysis of complex waveforms.

PRIOR ART

In prior art techniques, employing the use of mechanically resonant optical fibers for complex signal recognition, all of the vibrating resonant optical fibers are illuminated at once, rather than sequentially as is done in the technique of the present invention. An example of this prior art technique is disclosed in Pat. Nos. 3,213,197 and 3,310,809, issued to R. D. Hawkins, on Oct. 19, 1965, and Mar. 21, 1967, respectively. The technique disclosed in these patents pertains only to a complex, multi-frequency signal which can be handled or treated in totality. Neither discloses a scheme for sequentially illuminating or examining the individual outputs of a plurality of vibrating resonant optical fibers, so as to be able to break down the complex waveform input into its components for analysis. With the prior art techniques, all that is accomplished is signal recognition of a complex waveform, whereas in the present invention components comprising this complex waveform may be individually analyzed.

In Pat. No. 3,325,594, issued to J. S. Goldhammer et al., on June 13, 1967, a fiber optic scanning apparatus employing selective illumination of optical fibers is disclosed; however, the fiber optic device employed does not utilize resonating fibers, but is merely a circle-to-line converter. Once more, the object of this technique is the reproduction of a complex waveform in its entirety, rather than breaking it down into its individual components. The optical fiber apparatus employed in the Goldhammer technique merely serves to convey and reshape the distribution of the light. It does not have the additional feature peculiar to the present invention, namely, that of both conveying the light and modifying the light intensity in accordance with the individual physical resonance of the fibers in response to a complex driving function.

The emphasis in the techniques of the prior art is on examination of a complex waveform by recording in totality the contributions from a number of vibrating resonant optical fibers, as opposed to utilizing sequential illumination to break the complex waveform down into its components for purposes of spectral analysis.

SUMMARY OF THE INVENTION

An object of the present invention is to provide a new and improved method of obtaining a real-time spectral analysis of complex waveforms.

Another object of the present invention is to provide a new and improved method of obtaining a real-time spectral analysis of complex waveforms utilizing a plurality of mechanically resonant optical fibers.

A still further object of the present invention is to provide a new and improved method of obtaining a real-time spectral analysis of complex waveforms utilizing a plurality of mechanically resonant optical fibers and sequential illumination and detection to obtain the individual components of complex waveforms being analyzed.

A still further object of the present invention is to provide a new and improved method for obtaining a real-time spectral analysis of complex waveforms which overcomes the disadvantages of the prior art.

A method of obtaining real-time spectral analysis of complex waveforms, illustrating certain features of the invention, may include the steps of vibrating in unison a plurality of mechanically resonant optical fibers by the complex waveform to be analyzed, illuminating the fibers and detecting the output of the vibrating resonant optical fibers to obtain successive outputs which are the individual components of the complex waveform being analyzed.

Other objects and many of the intended advantages of this invention will be readily appreciated as the invention becomes better understood by reference to the following description when taken in conjunction with the following drawings wherein.

Figure 1:
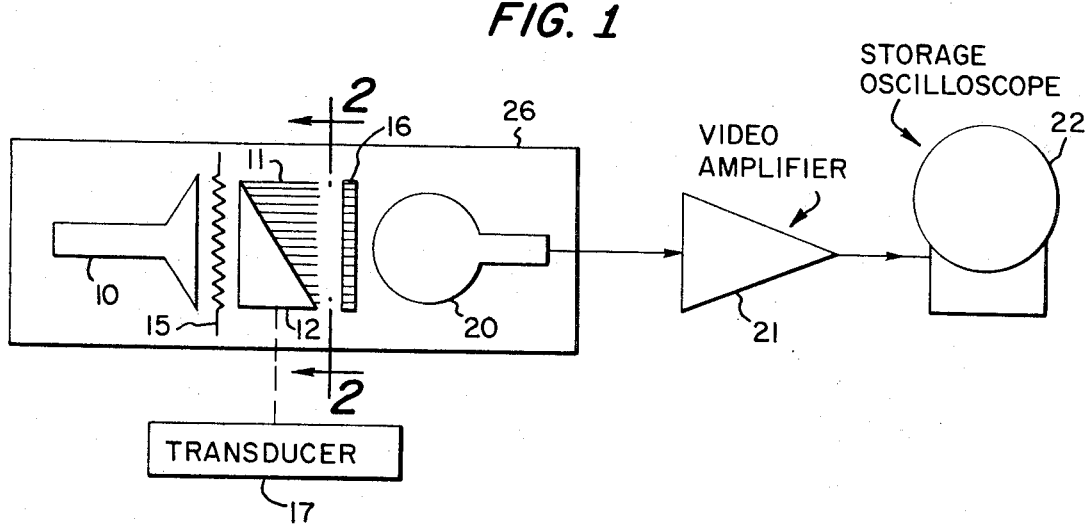
FIG. 1 is a schematic diagram of an apparatus with which methods embodying the invention may be practiced.

Referring now to FIG. 1, a cathode ray tube 10 is used to sequentially illuminate a plurality of mechanically resonant optical fibers 11—11 which are retained in a frequency responsive apparatus 12, known as a Sceptron, which is a registered trademark of the Sperry Gyroscope Company, Incorporated. The fibers 11—11 are sequentially illuminated by means of a rake scan on the face 13 of the cathode ray tube 10, after the light is collimated by passing through a lenticular lens 15. The light is then passed through a zero signal mask 16, which will not allow any light to pass when the resonant fibers 11—11 are at rest, which is the situation when no input waveform is being applied to the Sceptron 12. The complex waveform input is applied to the Sceptron 12 by means of an electromagnetic, piezoelectric, or other type of transducer 17.

The application of the input complex waveform to the Sceptron 12 by means of a transducer 17 so as to cause the mechanically resonant optical fibers to vibrate in unison in accordance with their individual resonant frequencies, is the conventional manner in which the Sceptron functions, as is described in Pat. Nos. 3,310,809; 3,213,197; 3,320,617; and 3,332,757, issued to R. D. Hawkins on Oct. 19,1965; Mar. 21, 1967; May 16, 1967; and July 25, 1967, respectively. If the light fibers 11—11 are caused to vibrate, light will be conveyed around the darkened spots in the zero signal mask 16. Each light fiber 11, being like a cantilever beam, will achieve a maximum excursion when a driving function corresponding to its naturally resonant frequency occurs. Thus, only those fibers that are the proper size for a particular driving frequency will have large movements. Direct illumination of individual fibers occurs due to the rake scan of the cathode ray tube 10. Individual outputs of the optical fibers 11—11 are detected by means of a photomultiplier tube 20. These individual outputs represent the individual components of the complex waveform being analyzed. The output of the photomultiplier tube 20 is then passed by conventional means, such as a video amplifier 21, to a storage device, such as a storage oscilloscope 22, where the complex waveform components can then be analyzed.

The mechanically resonant optical fibers 11—11 are vibrated in unison by the complex waveform to be analyzed. The cathode ray tube 10, having a face diameter commensurate with the dimensions of the mechanically resonant optical fibers 11—11, a group of the optical fibers 11—11 and the high sensitivity photomultiplier 20 are assembled in a light-tight enclosure 26. The scanning of the cathode ray tube spot produces the successive outputs through the vibrating fibers which are sensed by the photomultiplier 20 to produce a video output. This video output can then be displayed on the storage oscilloscope 22 as an amplitude-versus-frequency display or as frequency-versus-time-versus-amplitude display.

Figure 2:
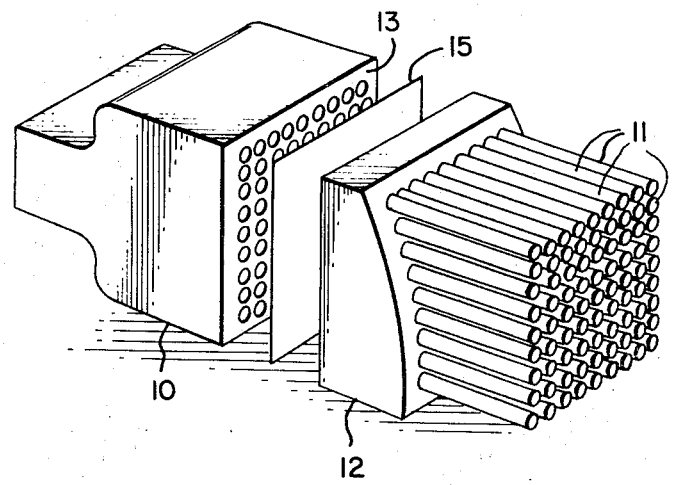
FIG. 2 is an enlarged perspective view taken along the line 2—2 of FIG. 1.

In FIG. 2, a detailed view of the Sceptron 12 is given. The Sceptron consists of a number of symmetrically arranged optical fibers 11—11, uniform in diameter and of various lengths, which are embedded in a plastic matrix which holds them firmly with respect to each other. The plastic matrix, however, is shaped so that the length of the fibers 11—11 varies uniformly from one extreme of length to another, not necessarily the entire length of any of the fibers. The tips of the fibers 11—11 are polished to a plane surface. The rear of the Sceptron 12, which is the base, is polished to a high degree of flatness. A rake scan of successive horizontal lines is generated on the face 13 of the cathode ray tube 10, the rake scan spacing corresponding to the spacing of the rows of fibers in the Sceptron 12. The cathode ray tube face 13 is placed adjacent to the lenticular lens 15, which, as has been previously mentioned, collimates the light, and this cathode ray tube-lenticular lens combination is placed flush with the rear of the Sceptron 12, so that light generated by the fluorescing of the phosphor on the face 13 of the cathode ray tube 10 is directly applied to the tips of each of the fibers 11—11, in turn, as the spot traces lines.

Figure 3:
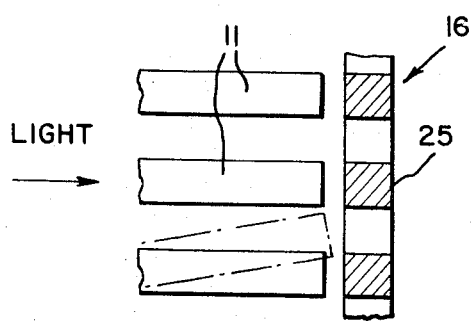
FIG. 3 is a side elevation, partially in cross section, of a portion of the apparatus shown in FIG. 1.

In FIG. 3, a portion of the zero signal mask 16 is shown. This mask may be made in the manner suggested in Pat. No. 3,320,617, by R. D. Hawkins et al., wherein a piece of sensitive photographic film is placed in front of the tips of the optic fibers and illumination is caused to pass through the fibers from the rear. Light from a source passes through the light fibers 11—11, impinging on the photographic film. Development of the film produces darkening of the film at the spots 25—25 where the light hits. Subsequently, very little light would be passed through the zero signal mask 16 to the photomultiplier 20 when no signal is applied to the Sceptron 12, the fibers 11—11 vibrate in accordance with their resonant frequency and light is conveyed around the darkened spots. The selective illumination of the individual fibers 11—11 occurs due to the fact that a well-focused spot on the face 13 of the cathode ray tube 10 dwells on the rear of each fiber for the time $t = (d_1/d_2) \div r$, where $d_1$=spot size, $d_2$=fiber diameter, and $r$=scan rate in centimeters per second, giving a sample at time $t_1$ of frequency $f_1$.

Employing this method, utilizing a reasonable scan time of 10 microseconds for 1000 fibers (a matrix of 20 lines of 50 elements per line) would allow 0.5 microsecond per line with a resultant of 0.01 microsecond per fiber, assuming no retrace time, and lenticular lens elements which would gather light for each fiber from a significant portion of the race near each element. Assuming that this scan time of the entire matrix is possible, the maximum frequency which could be analyzed would be 50,000 cycles per second on the basis of a sample rate of twice the highest frequency. Since the retrace time is a factor, a lower maximum frequency than 50,000 cycles per second would be necessary. With the above stated conditions, this will allow a real-time spectral analysis of complex waveforms having maximum frequencies somewhat less than 50,000 cycles per second, to be obtained.

Considering the preferred method of the present invention in detail, the mechanically resonant optical fibers 11—11 of the Sceptron 12 are vibrated in unison by the complex waveform which is to be analyzed. The individual vibrating fibers 11—11 are selectively illuminated due to a rake scan on the face 13 of the cathode ray tube 10, the selective illumination of the entire plurality of the fibers being timed to occur within the period of the complex waveform being analyzed. The resultant output of the Sceptron 12 is passed through the zero signal mask 16, which selectively passes the maximum excursion of the vibrating fibers 11—11 to the photomultiplier 20; the video output of the photomultiplier 20 is passed to the video amplifier 21 and then to the storage oscilloscope 22 which is used to store and display the individual components of the complex waveform being analyzed. The zero signal mask 16, as was previously mentioned, allows only the optical output of the fibers that are vibrating at any given instant of time to pass to the photomultiplier 20; thus, at any given instant of time, we may obtain an output which is the individual component which caused the excitation (vibration) of the associated resonant optical fiber. In this manner, real-time spectral analysis of a complex waveform may be achieved.

It is to be understood that the above described embodiment of the invention is merely illustrative of the principles thereof, and that numerous modifications and embodiments of the invention may be derived within the spirit and scope thereof. An example of such a modification is applying a light source to the entire fiber assemblage in the Sceptron, such as is described in Pat. No. 3,213,197, issued to R. D. Hawkins, and placing a mosaic, or matrix, of photo-diodes on the other end of the fibers, whereby each fiber will illuminate a single photo-diode which could then be sampled successively to determine the contribution from each resonant fiber. The resultant successive outputs, in this case, would be a result of the successive sampling of the photo-diode matrix rather than the successive scan of a cathode ray tube, as in the preferred method. Another modification would be to split up the Sceptron into groups of fibers in smaller frequency ranges, which could then be scanned using, for example, a commutator which would sample the output of each group of fibers successively and then initiate the start of scan of the next group of fibers.

What is claimed is:

1. A method of obtaining real-time spectral analysis of complex waveforms comprising the steps of:
   vibrating in unison a plurality of mechanically resonant optical fibers by the complex waveform to be analyzed;
   succesively illuminating the individual vibrating resonant optical fibers to obtain successive outputs and
   detecting the outputs of the vibrating resonant optical fibers to obtain successive outputs which are the individual components of the complex waveform being analyzed.

2. A method in accordance with claim 1, wherein the step of successively illuminating the individual vibrating fibers further includes the step of succesively illuminating the individual vibrating resonant optical fibers within the period of the complex waveform being analyzed.

3. A method in accordance with claim 2, wherein the step of successively illuminating the individual vibrating fibers further includes the step of scanning the individual vibrating resonant optical fibers with the flying spot of a cathode ray tube.

4. A method in accordance with claim 3, wherein the step of scanning the individual vibrating resonant optical fibers includes the steps of:
   generating a rake scan of successive lines on the face of the cathode ray tube; and spacing the rake scan in correspondence with the spacing of rows of mechanically resonant optical fibers to be successively illuminated by means of the rake scan.

5. A method in accordance with claim 4, wherein the step of vibrating in unison a plurality of mechanically resonant optical fibers includes the steps of:
applying the complex waveform to be analyzed to a vibratory device; and
applying the output of the vibratory device to the mechanically resonant optical fibers to drive the optical fibers in accordance with the complex waveform to be analyzed.

6. A method in accordance with claim 5, wherein the step of applying the output of the vibratory device to drive the optical fibers in accordance with the complex waveform to be analyzed includes the step of achieving a maximum excursion of the individual vibrating resonant optical fiber when a driving function corresponding to the natural resonant frequency of the fiber occurs.

7. A method in accordance with claim 6, wherein the step of applying the complex waveform to be analyzed to a vibratory device includes the step of applying the complex waveform to be analyzed to a vibratory transducer device.

8. A method in accordance with claim 7, wherein the step of successively illuminating the individual vibrating fibers includes the steps of:
collimating the output of the cathode ray tube before successively illuminating the individual vibrating optical fibers; and
directly applying the successive output of the cathode ray tube after it has been collimated to the tips of each of the vibrating optical fibers in turn as the spot traces lines.

9. A method in accordance with claim 8, wherein the step of detecting the successive outputs of the individual vibrating fibers includes the step of passing the successive outputs of the vibrating resonant optical fibers through a zero-signal mask.

10. A method in accordance with claim 9, wherein the step of detecting the successive outputs of the individual vibrating fibers further includes the step of applying the output of the zero-signal mask to a photomultiplier to successively detect the maximum excursion of the individual vibrating successively illuminated resonant optical fibers.

11. A method in accordance with claim 10, wherein the step of illuminating successively the individual vibrating resonant optical fibers includes the step of excluding extraneous illumination, other than from the generating source, from the optical fibers to be illuminated.

12. A method in accordance with claim 11, wherein the step of detecting the successive outputs of the individual resonant optical fibers includes the step of excluding extraneous illumination, other than from the generating source, from the successive outputs being detected.

13. A method in accordance with claim 12, wherein the step of applying the output of the zero-signal mask to a photomultiplier further includes the steps of:
applying the successive outputs of the photomultiplier to a recording device to successively display and store the individual components of the complex waveform being analyzed;
displaying successively the individual components of the complex waveform being analyzed; and
storing the successive individual components displayed for subsequent display.

References Cited
UNITED STATES PATENTS 3,394,976   7/1968   Hawkins _____ 346—1 X E. E. KUBASIEWICZ, Primary Examiner U.S. Cl. X.R.
178—76; 346—1